J. A. LEWIS.
Carriage-Spring.
No. 200,208. Patented Feb. 12, 1878.
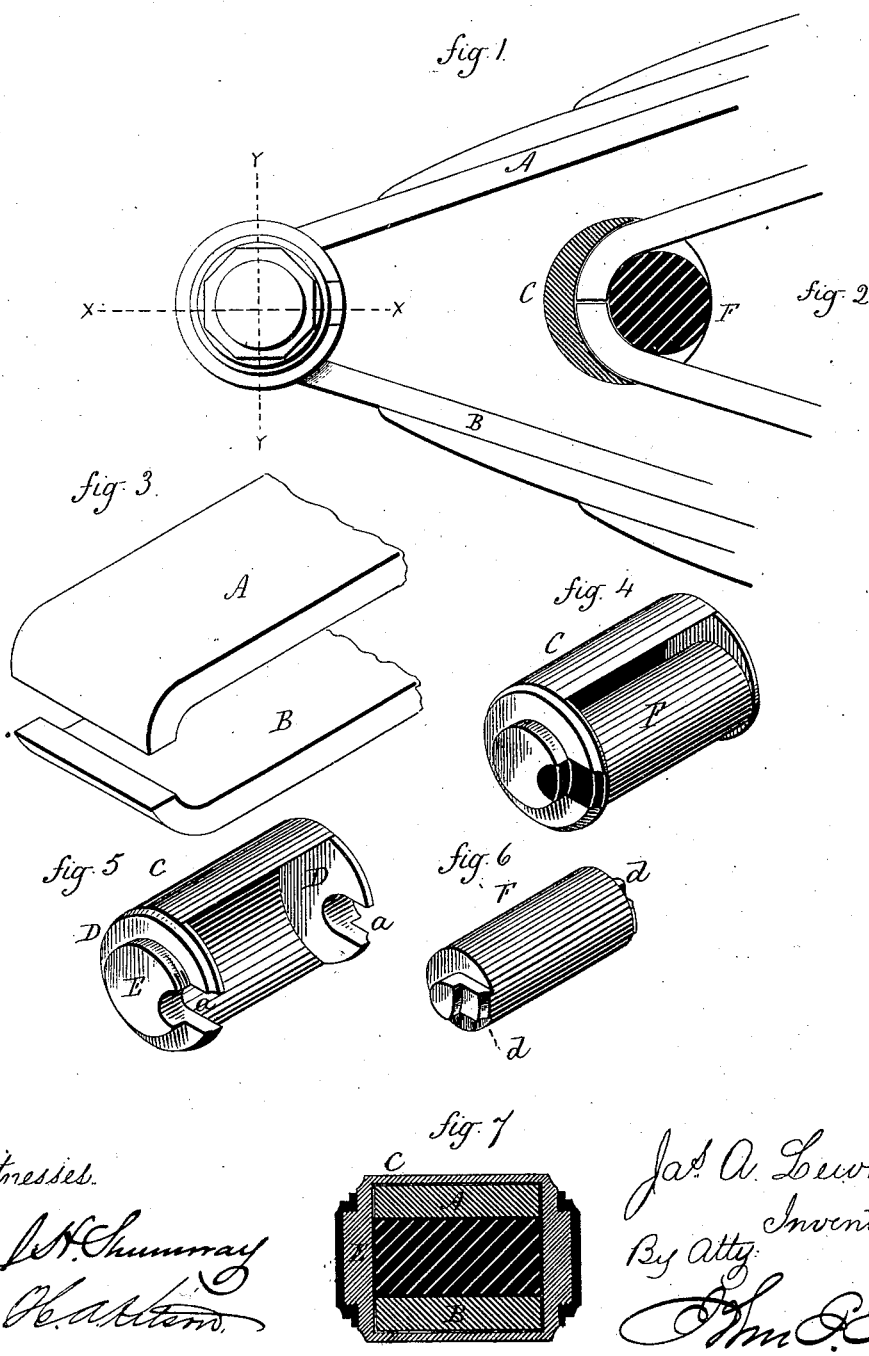

UNITED STATES PATENT OFFICE.

JAMES A. LEWIS, OF NEW HAVEN, CONNECTICUT.

IMPROVEMENT IN CARRIAGE-SPRINGS.

Specification forming part of Letters Patent No. 200,208, dated February 12, 1878; application filed January 14, 1878.

*To all whom it may concern:*

Be it known that I, JAMES A. LEWIS, of New Haven, in the county of New Haven and State of Connecticut, have invented a new Improvement in Carriage-Springs; and I do hereby declare the following, when taken in connection with the accompanying drawings, and the letters of reference marked thereon, to be a full, clear, and exact description of the same, and which said drawings constitute part of this specification, and represent, in—

Figure 1, side view; Fig. 2, section through the head; Figs. 3, 4, 5, and 6, parts detached; Fig. 7, section on line $y\ y$ of Fig. 1.

This invention relates to an improvement in the method of forming the joint or head at the end of elliptic springs; and it consists in the construction of the head end, as more fully hereinafter described, and particularly recited in the claim.

A represents the upper, and B the lower, parts of the spring. C is a cylindrical shell, having a head, D, at each end, substantially of circular form, the shell open upon one side, as seen in Fig. 5, the size of the head corresponding to the size of the spring.

On the outside of each head there is a projecting stud, E, which is threaded upon its periphery, and on each head, on the open side of the shell, a recess, $a$, is made, entering the periphery of the stud, as seen in Fig. 5.

F is a cylindrical bar, in length corresponding to the distance between the two heads of the shell C, and on each end is a projection, $d$, corresponding to the recess $a$ in the head, and also to a portion of the stud E, so that the bar F may be set between the two heads, the projections $d$ filling the recesses in the heads, as seen in Fig. 4.

Onto the studs E a nut is turned, which incloses that portion of the bars F which extend within the periphery of the studs E, and so that the said nuts will secure the bar F and cylinder C together, as seen in Fig. 7.

The ends of the springs are bent into segmental form, as seen in Fig. 3, and so as to correspond to the space within the cylinder C around the bar, as seen in Fig. 2.

To unite the two parts A and B of the spring, the bar F is removed by taking off the nuts; the cylinder placed over the curved ends of the spring; the bar F then placed between the ends of the springs, as seen in Fig. 2, and into its recesses in the cylinder; the nuts being then turned on, the spring is complete. The head thus produced is neat and tasteful in appearance, giving a much better finish to the head of the spring than can be produced by the usual construction.

It is not the intention in this application to broadly claim a spring-head of cylindrical form, detachable from the springs, but inclosing and securing the two ends of the spring together, as such is not new; but

What is claimed, and desired to be secured by Letters Patent, is—

The combination, in a carriage-spring, of the outer cylinder constructed with a head at each end, and a stud thereon fitted to receive a nut, and with a notch in each head extending into the said stud, a cylindrical bar arranged within said cylinder, and with projections corresponding to the notches in the heads, the two parts of the spring shaped to correspond to the space in the cylinder around the bar, and nuts on the said studs inclosing a portion of the projections on the said bar, substantially as described.

JAMES A. LEWIS.

Witnesses:
JOHN E. EARLE,
H. A. KITSON.